(12) United States Patent
Finch et al.

(10) Patent No.: US 9,576,395 B2
(45) Date of Patent: Feb. 21, 2017

(54) DISCRETE OBJECTS FOR BUILDING VIRTUAL ENVIRONMENTS

(71) Applicants: Mark T. Finch, Redmond, WA (US); Matthew B. MacLaurin, Woodinville, WA (US); Stephen B. Coy, Redmond, WA (US); Eric S. Anderson, Seattle, WA (US); Lili Cheng, Bellevue, WA (US)

(72) Inventors: Mark T. Finch, Redmond, WA (US); Matthew B. MacLaurin, Woodinville, WA (US); Stephen B. Coy, Redmond, WA (US); Eric S. Anderson, Seattle, WA (US); Lili Cheng, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/493,084

(22) Filed: Sep. 22, 2014

(65) Prior Publication Data

US 2015/0012890 A1 Jan. 8, 2015

Related U.S. Application Data

(63) Continuation of application No. 12/326,113, filed on Dec. 2, 2008.

(51) Int. Cl.
*G09G 5/00* (2006.01)
*G06T 17/10* (2006.01)
(Continued)

(52) U.S. Cl.
CPC .......... *G06T 17/10* (2013.01); *G06F 3/04815* (2013.01); *G06F 3/04842* (2013.01);
(Continued)

(58) Field of Classification Search
None
See application file for complete search history.

(56) References Cited

U.S. PATENT DOCUMENTS 5,877,777 A   3/1999 Colwell
5,900,880 A   5/1999 Cline et al.
(Continued)

OTHER PUBLICATIONS

Hay, et al., "Modeling Multiscale Landscape Structure within a Hierarchal Scale-Space framework", symposium on Geospatial Theory, Processing and Applications, retrieved at <<http://homepages.ucalgary.ca/~gjhay/PDFs/White_papers/2002_Hay_MScale_Hierarchical_SS.pdf>>, 2002, 4 pages.
(Continued)

*Primary Examiner* — Anh-Tuan V Nguyen
(74) *Attorney, Agent, or Firm* — Sandy Swain; Steve Wight; Micky Minhas

(57) ABSTRACT

Described is a virtual environment built by drawing stacks of three-dimensional objects (e.g., discrete blocks) as manipulated by a user. A user manipulates one or more objects, resulting in stack heights being changed, e.g., by adding, removing or moving objects to/from stacks. The stack heights are maintained as sample points, e.g., each point indexed by its associated horizontal location. A graphics processor expands height-related information into visible objects or stacks of objects by computing the vertices for each stack to draw that stack's top surface, front surface and/or side surface based upon the height-related information for that stack. Height information for neighboring stacks may be associated with the sample point, whereby a stack is only drawn to where it is occluded by a neighboring stack, that is, by computing the lower vertices for a surface according to the height of a neighboring stack where appropriate.

20 Claims, 6 Drawing Sheets

(51) Int. Cl.
*G06T 17/05* (2011.01)
*G06T 19/20* (2011.01)
*G06F 3/0481* (2013.01)
*G06F 3/0484* (2013.01)

(52) U.S. Cl.
CPC .......... *G06F 3/04845* (2013.01); *G06T 17/05* (2013.01); *G06T 19/20* (2013.01); *G06T 2219/2004* (2013.01); *G06T 2219/2008* (2013.01); *G06T 2219/2021* (2013.01)

(56) References Cited

U.S. PATENT DOCUMENTS

| | | | | |
|---|---|---|---|---|
| 5,929,860 | A * | 7/1999 | Hoppe | G06T 9/001 345/419 |
| 5,999,187 | A | 12/1999 | Dehmlow et al. | |
| 6,075,540 | A * | 6/2000 | Hoppe | 345/419 |
| 6,226,003 | B1 * | 5/2001 | Akeley | G06T 15/40 345/419 |
| 6,499,006 | B1 | 12/2002 | Rappaport et al. | |
| 6,573,893 | B1 | 6/2003 | Naqvi et al. | |
| 6,606,091 | B2 | 8/2003 | Liang et al. | |
| 6,956,565 | B2 | 10/2005 | Bloomenthal | |
| 7,043,695 | B2 | 5/2006 | Elber et al. | |
| 7,186,161 | B2 | 3/2007 | Salas Peralta | |
| 7,259,761 | B2 | 8/2007 | Shih et al. | |
| 7,471,291 | B2 | 12/2008 | Kaufman et al. | |
| 7,755,620 | B2 | 7/2010 | Scherer et al. | |
| 7,948,485 | B1 | 5/2011 | Larsen et al. | |
| 7,961,186 | B2 | 6/2011 | Li | |
| 2001/0035867 | A1 * | 11/2001 | Murayama et al. | 345/585 |
| 2002/0060685 | A1 * | 5/2002 | Handley et al. | 345/582 |
| 2002/0190988 | A1 * | 12/2002 | Maillot et al. | 345/428 |
| 2003/0021491 | A1 * | 1/2003 | Brust | 382/294 |
| 2003/0117528 | A1 * | 6/2003 | Liang | G06T 13/60 348/578 |
| 2003/0132966 | A1 | 7/2003 | Simas et al. | |
| 2003/0184545 | A1 | 10/2003 | Ohto | |
| 2004/0236539 | A1 * | 11/2004 | Clark et al. | 703/1 |
| 2005/0024360 | A1 * | 2/2005 | Abe et al. | 345/419 |
| 2005/0057579 | A1 * | 3/2005 | Young | G06T 19/20 345/649 |
| 2005/0219240 | A1 * | 10/2005 | Vesely et al. | 345/419 |
| 2005/0285852 | A1 * | 12/2005 | Fossum | G06T 17/05 345/419 |
| 2006/0017740 | A1 * | 1/2006 | Coleman | G06T 15/04 345/582 |
| 2006/0136180 | A1 * | 6/2006 | Hansen et al. | 703/1 |
| 2006/0202989 | A1 | 9/2006 | Yinghui | |
| 2007/0063997 | A1 * | 3/2007 | Scherer et al. | 345/419 |
| 2007/0124125 | A1 * | 5/2007 | Young et al. | 703/6 |
| 2007/0211053 | A1 | 9/2007 | Hughes | |
| 2007/0280528 | A1 * | 12/2007 | Wellington | G05D 1/0274 382/154 |
| 2008/0238916 | A1 | 10/2008 | Ghosh et al. | |
| 2009/0015584 | A1 | 1/2009 | Shimizu | |
| 2009/0202109 | A1 * | 8/2009 | Clar | G01C 15/00 382/104 |
| 2010/0138793 | A1 | 6/2010 | Finch et al. | |

OTHER PUBLICATIONS

Bjurman, et al., "Chalmers", retrieved at <<http://www.ce.chalmers.se/~uffe/xjobb/Tankaction.pdf>>, 2007, 65 pages.

Schnabel, Marc Aurel, "3D Maze: Creation and Translation of Abstract Architectural Virtual Environments", retrieved at <<http://www.arch.hku.hk/~marcaurel/phd/icce03draft.pdf>>, 2003, 8 pages.

Ibbotson, Ian, "Multi/Sub-Object Materials", retrieved at <<http://www.cadtutor.net/tutorials/3ds-max/multi-sub-object.php>>, Retrieved date: Aug. 20, 2008, 9 pages.

Oh, et al., "A System for Desktop Conceptual 3D Design", 2004, Virtual Reality, pp. 198-211.

Stone, "A 3D Emulator with a Child-Friendly Interface", 2005, Mathematics and Computing, pp. 1-46.

Bishop, et al., "Designing a PC Game Engine", Jan. 1998, IEEE Computer Graphics in Entertainment, pp. 46-53.

"Non-Final Office Action for U.S. Appl. No. 12/326,113", filed Dec. 2, 2008, Mailed Date: Oct. 13, 2011, 19 pages.

"Applicant Initiated Interview Summary for U.S. Appl. No. 12/326,113", filed Dec. 2, 2008, Mailed Date: Jan. 11, 2012, 3 pages.

"Final Office Action for U.S. Appl. No. 12/326,113", filed Dec. 2, 2008, Mailed Date: Mar. 5, 2012, 18 pages.

"Non-Final Office Action for U.S. Appl. No. 12/326,113", filed Dec. 2, 2008, Mailed Date: Feb. 21, 2013, 15 pages.

"Non-Final Office Action for U.S. Appl. No. 12/326,113", filed Dec. 2, 2008, Mailed Date: Jul. 17, 2013, 17 pages.

"Final Office Action for U.S. Appl. No. 12/326,113", filed Dec. 2, 2008, Mailed Date: Oct. 31, 2013, 20 pages.

"Non-Final Office Action for U.S. Appl. No. 12/326,113", filed Dec. 2, 2008, Mailed Date: Mar. 21, 2014, 17 pages.

"Final Office Action Issued in U.S. Appl. No. 12/326,113", Mailed Date: Apr. 17, 2015, 19 Pages.

Jzan, et al., "Visit of a 3D House Using OPENGL", retrieved at <<https://web.archive.org/web/20060715000000*/http://cs.fit.edu/~wds/classes/graphics/Conf/f00/uzanchai.doc>>, archived date of Dec. 14, 2006, pp. 1-12.

Nighbert, Jeffery S., "Characterizing Landscapes for Visualization through "Bump Mapping" and Spatial Analyst", retrieved at <<https://web.archive.org/web/*/http://gis.esri.com/library/userconf/proc03/p0137.pdf>>, archived date of Dec. 3, 2006, 14 pages.

\* cited by examiner

DISCRETE OBJECTS FOR BUILDING VIRTUAL ENVIRONMENTS

BACKGROUND

Computer simulated environments such as virtual worlds are one of the ways that users interact with computer systems and gaming machines. To support real-time interaction, such systems need to be efficient in rendering scenes and in how they handle user interaction, particularly manipulation of data by users to build the environment.

In contemporary technologies related to simulated environments, large scale terrain data and constructive solid geometry (CSG) techniques may be used. Large scale terrain data is frequently represented as heightmaps of sample points, with the terrain surface generated essentially by laying a "sheet" over the sample points. While convenient for rendering geographic information system (GIS) data as obtained from satellites, it is difficult for users to manipulate such data; for example, heightmap surfaces cannot represent vertical walls, and are especially unsuited for use in interior environments, such as buildings. Constructive solid geometry techniques are generally used for interior spaces, but suffer from extreme limitations. For example, CSG modeling tools are non-intuitive and require extensive training, as well as considerable talent to generate desired results. Further, they are generally not suited for exterior spaces such as landscapes.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a virtual environment is built by drawing stacks of three-dimensional objects (e.g., blocks) as manipulated by a user. A user provides interaction corresponding to an object being manipulated in the computer-simulated environment, which results in height-related information of the object being determinable. Graphics are rendered to output an updated representation of the computer-simulated environment as a result of the user interaction. For example, a stack of one or more objects is increased in height or decreased in height as a result of the object being added, deleted or moved.

In one aspect, vertices used in rendering the stack are determined based upon a sample point including the height-related information of each stack. The horizontal position of the stack is determined from the index for that sample point. Further, height information for neighboring stacks may be associated with the sample point, whereby when partially occluded by a neighboring stack, the stack only needs to be drawn until it starts being occluded by that neighboring stack, that is, by computing the lower vertices according to the base height of the underlying surface or the height of a neighboring stack, whichever is higher.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a computer-simulated environment technology in which the "world" is represented to the user as stacks of three dimensional objects such as blocks (typically cubes or cuboids, also called rectangular prisms) of various materials. In general, an environment (or part of the environment) is built and manipulated by user interaction directed towards piling the objects into stacks, removing objects, and pushing objects around, e.g., as discrete objects. As will be understood, an extremely efficient representation is described herein that allows rendering in real time to represent such manipulation.

Note that while cube-like blocks are described and shown herein as examples, particularly because they stack and tile well, other suitable polyhedrons or geometric objects, such as hexagonal prisms, or even non-tiling objects, may be used instead of cubes or in addition to cubes. Thus, it should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and computer simulated environments in general.

Figure 1:
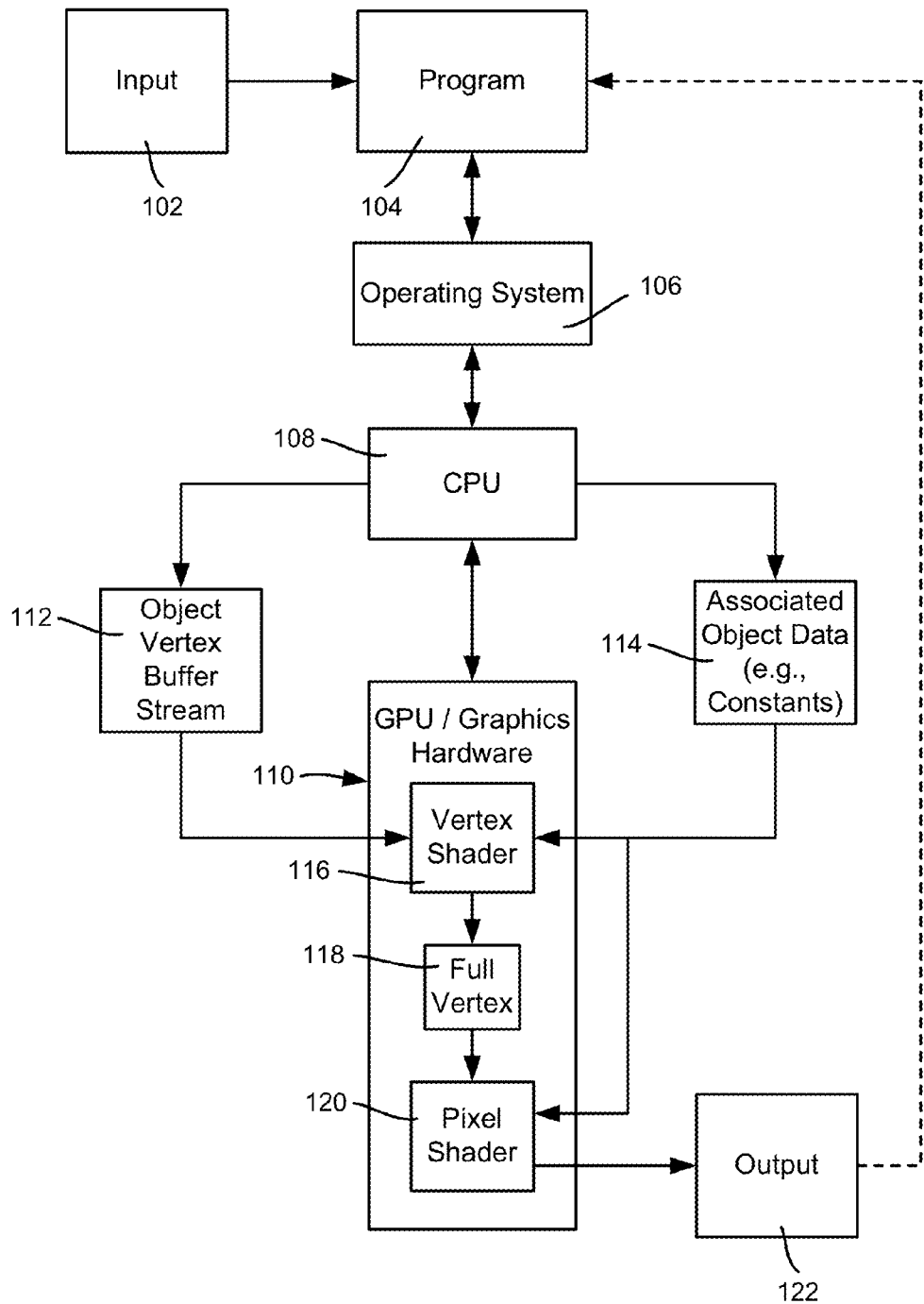
FIG. 1 is a block diagram showing a computing environment having example components for processing user interaction data to build virtual environments with discrete objects.

Turning to FIG. 1, there is shown an example system, such as integrated into a computing machine (e.g., a computer system or game console), in which various components handle various stages of discrete object manipulation for building a virtual environment. In general, a user interacts via a mechanism such as a computer program controlled by via human interface device and sees the results on a display or the like. This user manipulation is represented in FIG. 1 by the input 102 to a virtual environment program 104 running on an operating system 106. The operating system 106 runs via a CPU 108 which is coupled to graphics hardware including a GPU 110.

As described below, based upon the input 102, the program 104 generates data which is received as object vertex buffer stream data 112 and associated object data 114 (e.g., various constants and the like, described below) at a vertex shader program 116 running on the GPU 110. The stream data include height-related information for each object, as also described below. The vertex shader program 116 uses the vertex buffer stream data 112 and the constants 114 to compute a full vertex set 118, which is then rasterized via a pixel shader 120 into output 122, e.g., viewed as rendered objects on a display in a window or other viewing area associated with the program 104.

Figure 2:
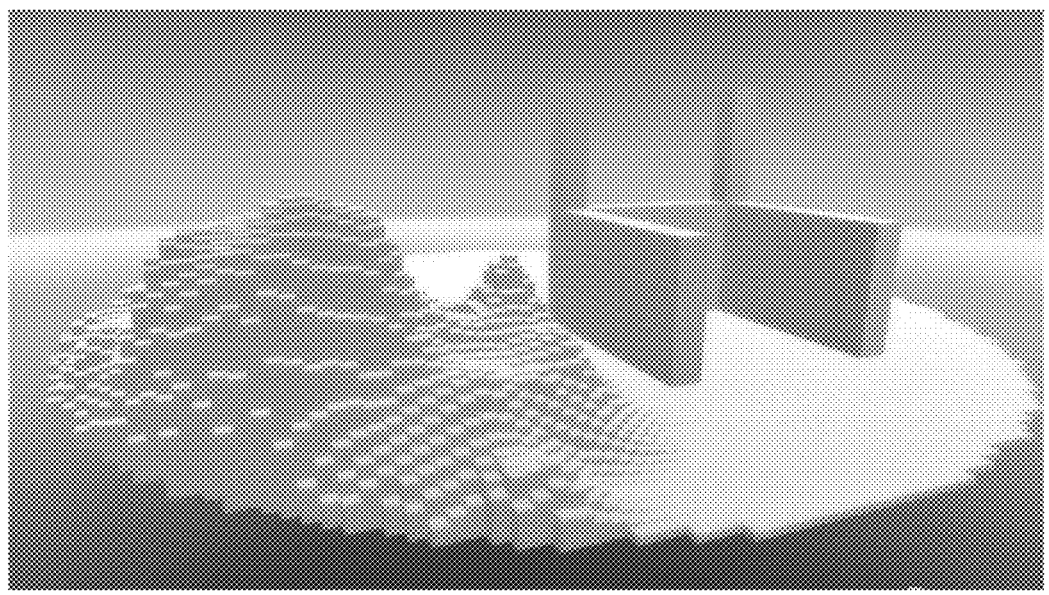
FIG. 2 is a representation of a virtual environment built with discrete objects.

As exemplified in FIG. 2, the system presents an environment (or some part thereof) via stacks of objects; note that gentle slopes are formed from a series of progressively taller stacks. In general, the use of object stacks allows the efficiency of heightmaps to be combined with the intuitive ease of volumetric mechanisms. Having a landscape built from piles of three-dimensional objects conveys to the user that the interaction is with solid objects, (rather than a two-dimensional deforming surface, for example). In other words, because the environment is presented as discrete chunks of matter, there are no user perception or interaction issues that arise from trying to stretch a flat texture over a two-dimensional surface in three-dimensional space, as in other approaches, whereby textures remain undistorted. This engages the user's real world intuition, as people are used to interacting with solid objects.

In one implementation, the environment is stored and accessed by the program 104 as a series of heightmaps of sample points, e.g., each point indexed according to a horizontal (x, y) grid location, such as in an array. Each sample point thus includes the data that determines the height of the stack of objects centered at that point, which in one implementation is relative to a base height. Each sample point also may contain a material tag, which determines the appearance and physical properties of that stack of object(s), wherein a stack comprises one or more objects. For example, the tag may identify a particular set of texture, shading data and so forth that is maintained and/or computed from part of the associated object data 114.

Figure 3:
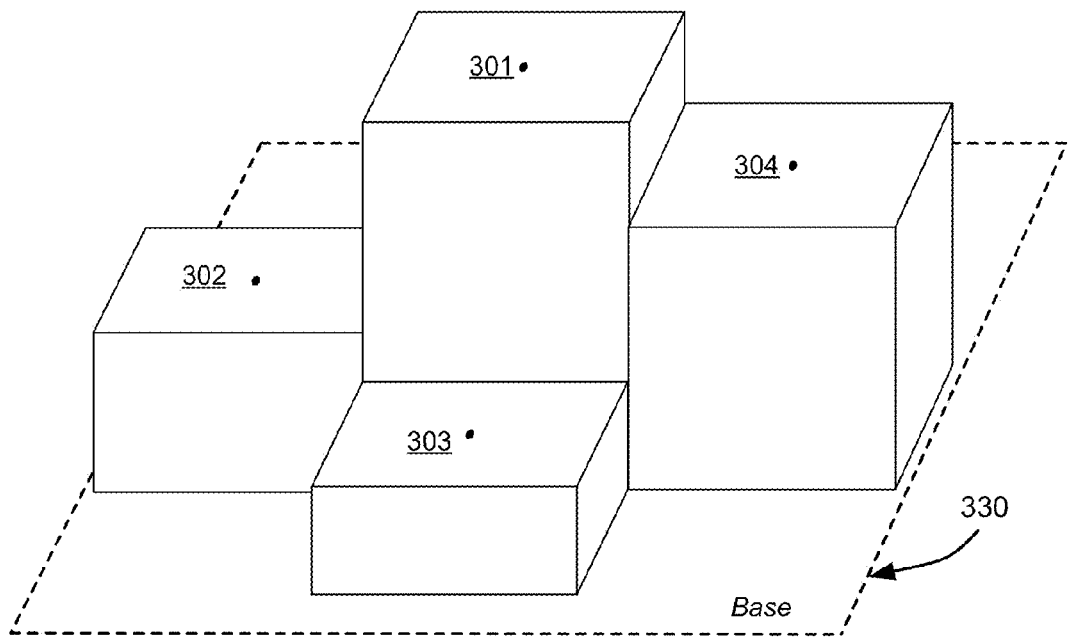
FIG. 3 is a representation of rendered discrete objects (blocks) stacked for use in a virtual environment.

In one implementation, as part of the vertex buffer stream data 112, a single dataset (e.g., point) per stack of objects is passed to the hardware for rendering. The point contains the height of the center of the top of that stack relative to the base, e.g., corresponding to stack 301 in FIG. 3, as well as the heights of the four neighboring stacks in the cardinal directions; (note that only three stacks are visible in FIG. 3 given this particular viewing angle, namely stacks 302-304, but as can be readily appreciated, one stack may be behind the stack 301 and visible from a different viewing angle). Thus, one example of such a structure for representing a stack of one or more objects (e.g., indexed by its x, y coordinate), is <height, left neighbor height, right neighbor height, front neighbor height, rear neighbor height, material tag>, in any suitable ordering. For an implementation in which all of the objects that have the same height, the height-related data may be equivalently represented by the count of objects in each stack and computed by a simple multiplication of the per block height; also, negative heights/object counts are feasible to represent depressions below the base height. Other data may be present in each sample point. In any event, as can be readily appreciated, such a small amount of data per sample point provides an extremely efficient internal representation of a landscape that consumes very small amounts of storage. As described below, in one implementation this is all of the data needed to facilitate rendering in a manner that is very suitable for contemporary consumer graphics hardware.

In this example scheme, the horizontal (x, y) position of the stack is inferred from the vertex's index. Note that this is based upon each block having the same fixed, height, length and width, (the length and width may be the same as one another thus making the top of each stack a square as in FIG. 3; objects that are cubes exist if the height of each is also the same as the length and width). In a more complex implementation, different height, length and/or width objects may be allowed, possibly with non-rectangular (e.g., hexagonal) tops and/or faces. Similarly, it is feasible to have an implementation in which objects in a stack may have different material tags. Stacking upon fractional parts of objects is another alternative, including a system which allows stacks that are not necessarily multiples of the object length, width and/or height. In such implementations, more data needs to be passed to represent each object and/or its position, or at least for differing subsets of a stack.

Figure 4:
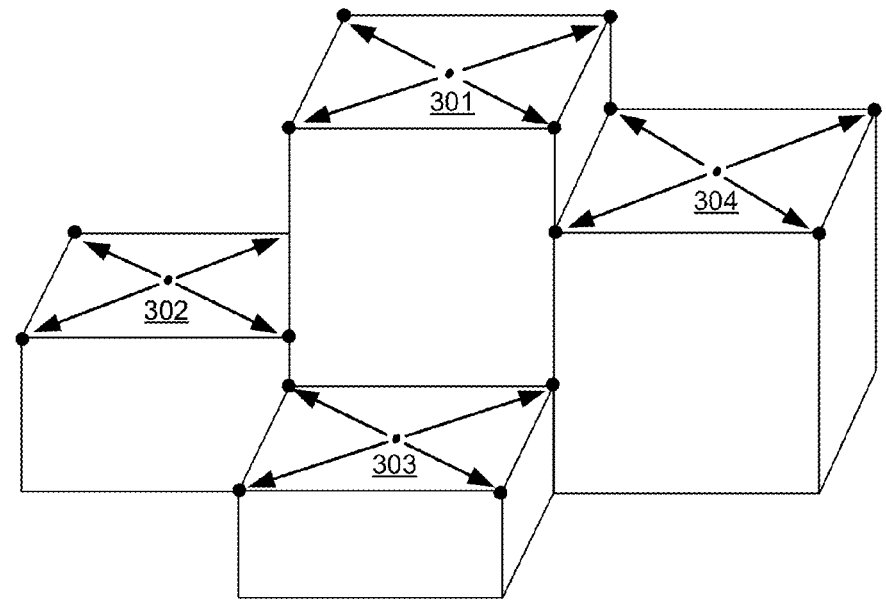
FIG. 4 is a representation of computing vertices of top surfaces from sample points/height information for rendering the discrete objects of FIG. 3.
Figure 5:
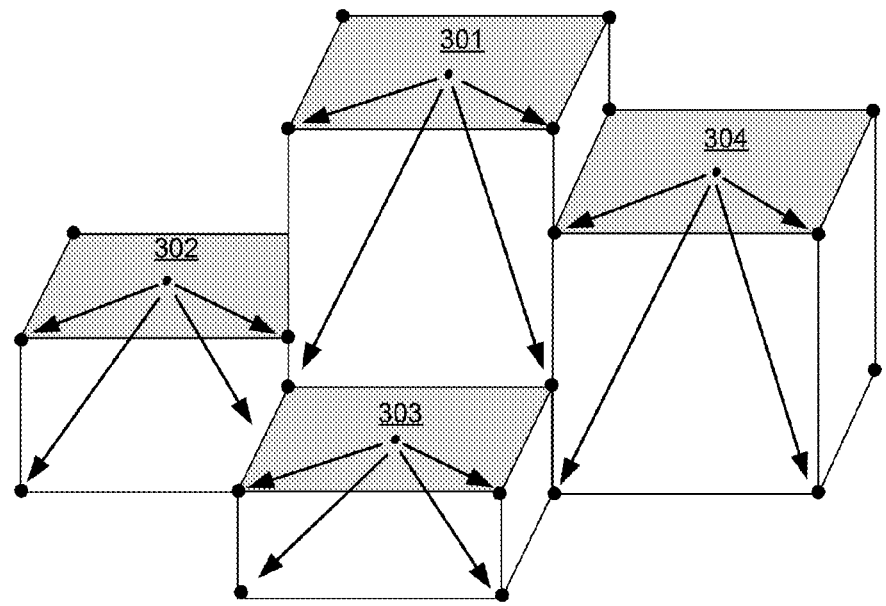
FIG. 5 is a representation of computing vertices of front surfaces from sample points/height information for rendering the discrete objects of FIG. 3.
Figure 6:
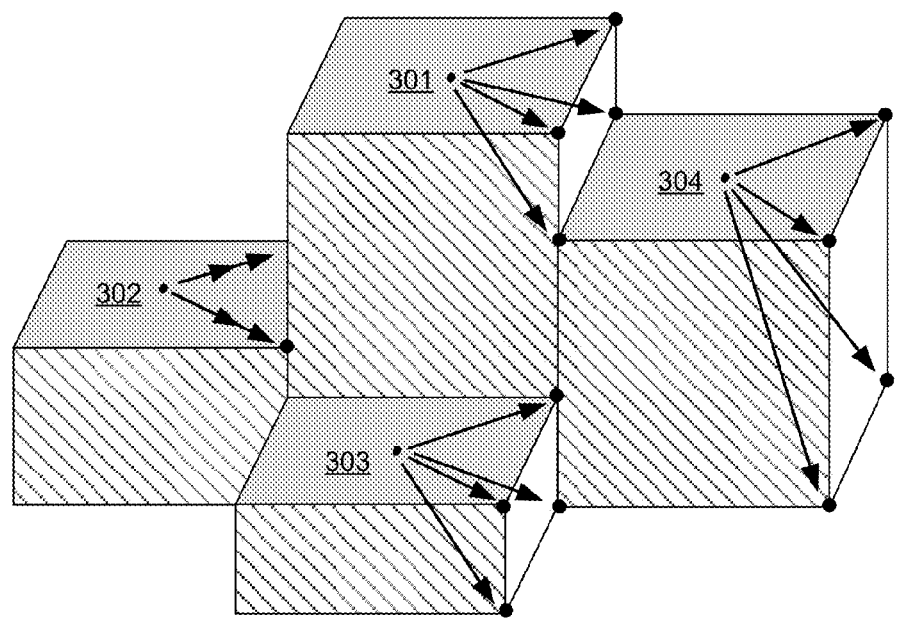
FIG. 6 is a representation of computing vertices of side surfaces from sample points/height information for rendering the discrete objects of FIG. 3.

As represented in FIGS. 4-6 in which the stacks are built from uniformly-sized blocks of uniform materials per stack, from these five floating point values, the hardware generates the vertices of each stack that comprising position, normal, and texture coordinates that are needed for rendering. Using these five values to generate each stack represents a compression of 192:5, which significantly reduces memory usage and bus bottlenecks.

In general, each vertex of the height map is expanded into a full cube (conceptually), with those cubes selected from a library of detailed cube types or the like, providing a graphically detailed visualization (in contrast to a straight rendering of the heightmap). In this example, the rendering is done in up to five passes, one pass for each object facing direction that is visible based on the viewing angle, (that is, visible to the "camera"). There is always one face direction which is on the far side of the object stacks, and need not be rendered. Further, when the camera is above the base height for a group of stacks, then the bottom faces also need not be rendered, whereby only four passes are needed. Similarly, when the camera is below the base height, the top faces need not be rendered.

For example, FIG. 4 shows computing (and rendering) the top surfaces' positions given the stack heights for four of the stacks. FIG. 5 shows computing/rendering the front faces, and FIG. 6 computing/rendering the side faces. The camera position is known, and thus the angles for the various faces are known for that camera position.

Note that drawing each stack in its full height may result in impractical levels of overdraw which may prevent rendering from reaching interactive rates, (and is inefficient even if not impractical on a given system). To avoid such overdraw processing, the heights of the four cardinal neighbors are provided as part of the sample point's data, whereby the side faces need only be extended down far enough to reach the top of the neighboring stack, or the base height if none. As a result, there is no processing wasted to draw a front side face down to the base when some of it would be occluded by the neighboring stack. Thus, as can be seen, the front face of stack 301 only needs to be drawn to the top of the block 303, which extends to the base surface 330, which is accomplished when computing the vertices for that front face. Similarly, the right side of the block 301 only needs to be drawn to the top of the block 304. Note that this assumes opaque blocks; in an implementation in which a stack or portion thereof is allowed to be somewhat translucent or fully transparent, more drawing is needed behind such a stack. Further, it is feasible to stop drawing based on side occlusion, e.g., the top, front and right surfaces of the stack 302 are occluded in part or in whole by the stacks 301 and 303, whereby drawing the full stack 302 is not necessary to see its visible portion; a shorter stack behind the block 301 need not be (and is not) drawn at all. Note that in one implementation, CPU processing can determine an order to draw the stacks and/or which stacks not to send for drawing based upon the camera angle. Indeed, the overall processing may be divided in virtually any way between the CPU and GPU. As can be readily appreciated, however, significant advantages arise from having the CPU 108 provide only small amounts of data (e.g., the five heights plus the material tag) in the stream data 112 to the GPU 110, including that the memory usage is small and bus bottlenecks are avoided by letting the highly parallel GPU architecture compute and render the various blocks from these small amounts of data.

In sum, the system is based on a height field, but unlike other height field methods, the system supports purely vertical walls; (note that heightmap techniques in general do not allow for such vertical walls). Further, vertical walls are natural to construct from the user's perspective, as if placing cinder blocks or toy blocks upon one another. While in one implementation the stacks are restricted to alignment with an underlying virtual grid, objects may be moved from stack to stack, added or deleted. The perception is that the interaction is with solid physical material, rather than deforming a virtual surface.

Figure 7:
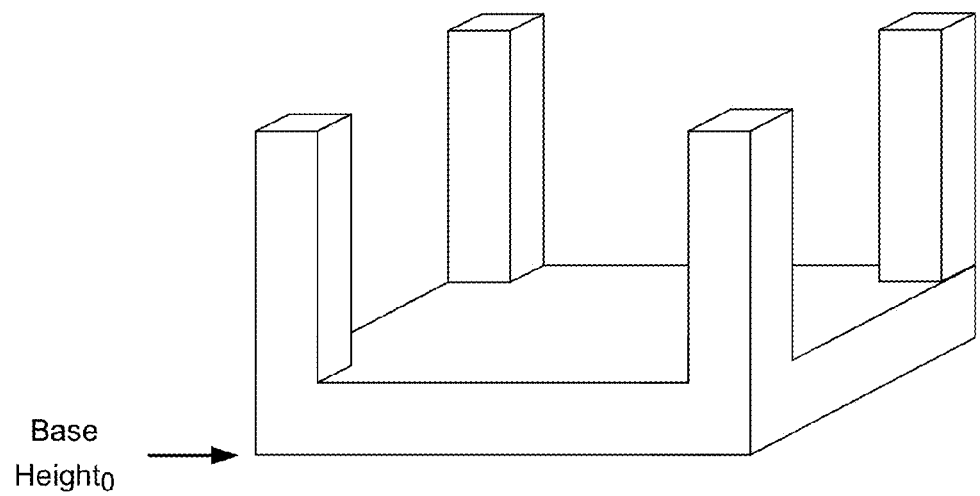
FIGS. 7 and 8 are representations of how sets of discrete objects may be layered in levels (e.g., as in floors of a building) by changing an underlying base height for each level.
Figure 8:
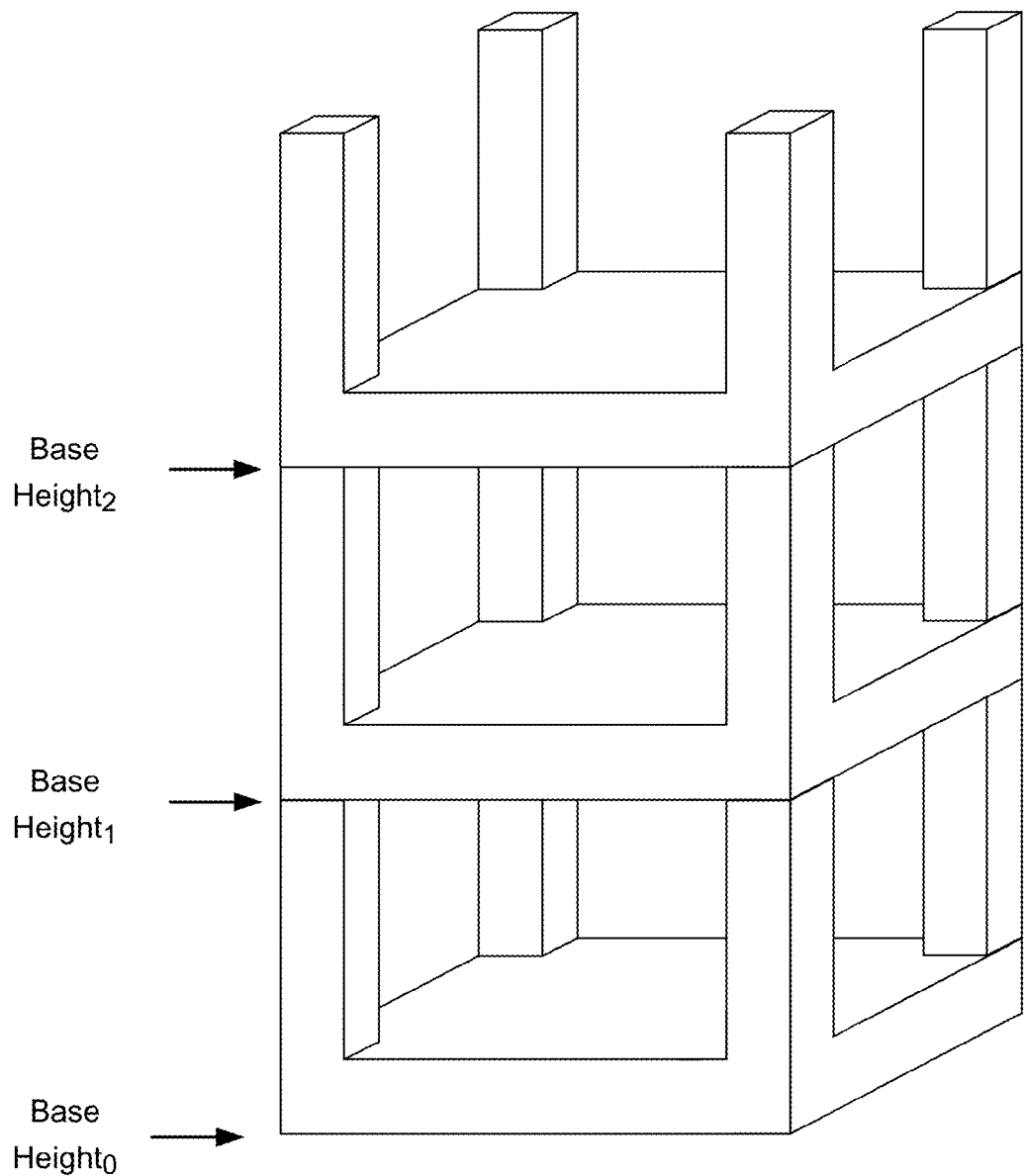

Turning to another aspect, multiple levels are easy to construct, as each group of blocks can have its own base height. For example, with successive layering by changing the base height for each layer, multiple floors of a building may be presented as in FIGS. 7 and 8. In general, to construct a building with multiple floors, for example, the user lays out the first floor and its walls on the ground (as Base Height$_0$), selects the top of the wall as the next base height (Base Height$_1$) for the next group of objects, and then lays out the next floor and its walls with those objects, and so on. The base heights may be varied by changing the associated object data 114 when appropriate, for example. Because the approach represents solids rather than surfaces, there are no complications resulting from missing bottoms or insides.

There is thus provided a technology in which via objects, a user is able to predict what is going to happen to terrain as it is edited, unlike a typical virtual environment system in which unpredictable visual artifacts such as creases, unusual shadows, and the like regularly are present. With an object-centric user interface, the system is able to provide a user experience that matches, to a significant extent, user expectations and on-screen results. Most users can predict the change to a terrain as they move objects up and down, and the system meets their expectations.

For example, the program may provide a "cube" (or other block) tool from which a type of cube to place may be chosen, so as to start placing cubes into the world. Cubes may be chosen and/or changed by their (or their stack's) material tag, e.g., grass, dirt, plastic and so forth materials may be present. When a terrain is formed by the stacks, a shaping tool may be used to reshape (e.g., level, push, and so forth) the terrain. Cubes may be deleted. Further, existing cubes which are touched by a brush or the like may be converted to a different (e.g., a currently active) material.

Water is one possible cube type. In general, the user may place water by activating the cube tool, selecting the water material, and moving a brush to a desired start point before activating. The height of the start point is stored as the water level for the current body of water. A flood fill is initiated from that point in the horizontal plane. The fill stops when it reaches terrain higher than the start point, or when it reaches the edge of the world; (the edge of the world is defined by terrain boundaries, and water can only exist as a layer on top of terrain). The perceived effect is that of water having been poured into the level, flowed downhill to fill contiguous deposits, and poured continuously until the water has reached the level of the start point.

Figure 9:
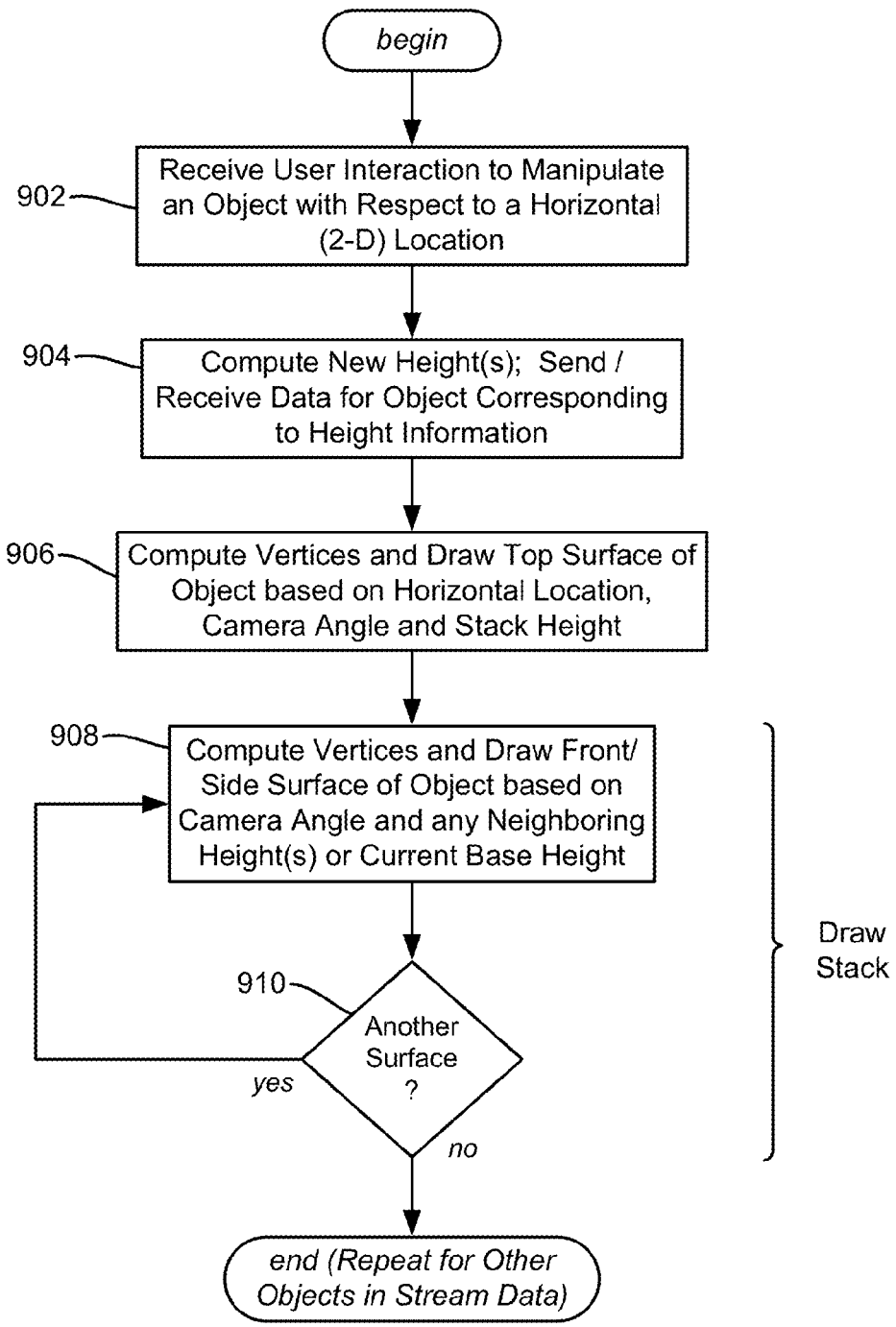
FIG. 9 is a flow diagram showing example steps that may be taken to process user interaction data directed to manipulating discrete objects for rendering in a virtual environment as three-dimensional representations of those objects.

FIG. 9 summarizes various operations of one such system, beginning at step 902 where user interaction data (e.g., commands and directional data) are received, such as corresponding to adding, removing or moving a discrete object. The program accordingly adjusts the data to account for the change in height of each stack involved. Step 904 represents the height information of the sample point being provided from the CPU to the GPU. Note that when the last object of a stack is removed, no data need be sent for that sample point in an implementation in which the visible stacks are redrawn in each frame (or at least each changed frame), that is, there is no need to "erase" deleted object, it is just not redrawn in the next frame.

Step 906 represents the top surface of the stack being drawn by computing the vertices, which is based upon the stack height information and the camera angle. Any shading may also be performed. Steps 908 and 910 repeat the computations and rendering for the front and side surfaces.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing machine that generates output representing a computer-simulated environment, a method comprising:
   providing a computer-simulated interactive environment, including a number of three dimensional objects configured to convey to a user that user interaction is with solid objects;
   receiving the user interaction to manipulate at least one three dimensional object in the computer-simulated interactive environment;
   responsive to the user interaction to manipulate the at least one three dimensional object, communicating a dataset associated with the at least one three dimensional object to graphics hardware, the dataset comprising height-related information of the at least one three dimensional object as a result of the manipulation, the height-related information comprising a height of the at least one three dimensional object relative to a base height and one or more heights of one or more immediate neighboring three dimensional objects relative to the base height, wherein the dataset associated with the at least one three dimensional object is different from a dataset associated with another three dimensional object to be manipulated; and
   rendering graphics in real-time based on the user interaction to manipulate the at least one three dimensional object using the dataset communicated, including the height-related information, to output an updated representation of the computer-simulated interactive environment as a result of the user interaction, wherein rendering the graphics comprises computing vertices for at least one of a front surface or a side surface of the at least one three dimensional object, including determining the vertices to render based on the height of the at least one three dimensional object and the height of an immediate neighboring three dimensional object from the dataset communicated, such that non-occluded vertices are rendered and occluded vertices are not rendered.

2. The method of claim 1 wherein receiving the user interaction further comprises:
   receiving manipulation instructions to add the at least one three dimensional object at a horizontal location within the computer-simulated interactive environment; and
   increasing height-related information corresponding to the horizontal location to account for the at least one three dimensional object being added.

3. The method of claim 1 wherein receiving the user interaction further comprises:
   receiving manipulation instructions to remove the at least one three dimensional object from a horizontal location within the computer-simulated interactive environment; and
   decreasing height-related information corresponding to the horizontal location to account for the at least one three dimensional object being deleted.

4. The method of claim 1 wherein receiving the user interaction further comprises:
   receiving manipulation instructions to move the at least one three dimensional object from a first horizontal location within the computer-simulated interactive environment to a second horizontal location within the computer-simulated interactive environment; and
   decreasing first height-related information corresponding to the first horizontal location and increasing second height-related information corresponding to the second horizontal location to account for the at least one three dimensional object being moved.

5. The method of claim 1 further comprising:
   computing vertices for a top surface of the at least one three dimensional object to be rendered based upon the height-related information.

6. The method of claim 1 further comprising:
   indexing a plurality of horizontal locations of the computer-simulated interactive environment, individual horizontal locations of the plurality of horizontal locations having individual data used to determine a height of a stack of one or more three dimensional objects centered at that individual horizontal location relative to a base height.

7. The method of claim 6 wherein the individual data of the individual horizontal locations further comprises height-related information of four immediate neighboring stacks of three dimensional objects in cardinal directions from the stack of one or more three dimensional objects centered at that individual horizontal location.

8. The method of claim 1 further comprising:
   computing vertices for at least one of a front or a side surface of the at least one three dimensional object to be rendered based upon the height-related information, including by changing a current base height corresponding to a level associated with a first group of three dimensional objects to provide a new base height corresponding to another level associated with another group of three dimensional objects within the computer-simulated interactive environment.

9. The method of claim 8 wherein the level associated with the first group of three dimensional objects corresponds to a first floor of a building within the computer-simulated interactive environment, and the other level associated with the other group of three dimensional objects corresponds to a second floor of the building, the base height of the other group of three dimensional objects corresponding to a top of a wall represented by the first group of three dimensional objects.

10. The method of claim 1 further comprising:
   for an individual three dimensional object at a horizontal location, processing the height-related information and a viewing angle associated with the user within the computer-simulated interactive environment to render a stack of three dimensional objects at that horizontal location, including a plurality of non-occluded surfaces of the stack based at least in part on the viewing angle associated with the user within the computer-simulated interactive environment.

11. A system comprising:
   a processing unit;
   an interactive interface coupled to the processing unit and configured to convey to a user that user interaction is with solid physical material in a virtual environment; and
   a mechanism coupled to the interactive interface and configured to receive data responsive to the user interaction with a stack of materials in the virtual environment via a representation of the stack of materials, the stack of materials stacked at a horizontal location upon a base surface or upon one or more other stacks of materials or fractional parts of the one or more other stacks of materials, the mechanism communicating a dataset comprising height-related information associated with the stack of materials from the received data to graphics hardware based upon the user interaction in real-time, the height-related information comprising a height of the stack of materials relative to a base height and one or more heights of one or more immediate neighboring stacks of materials relative to the base height, the graphics hardware rendering the stack of materials at a vertical position that corresponds to the height-related information within the computer-simulated environment, wherein the dataset is indexed by the horizontal location, and wherein the graphics hardware that renders the stack of materials draws at least one of a front surface or a side surface of at least part of the stack of materials by computing vertices that are determined at least in part by the height of an immediate neighboring stack of materials from the dataset communicated, such that non-occluded vertices are rendered and occluded vertices are not rendered.

12. The system of claim 11 wherein the user stacks an object representing a material upon a stack of one or more other objects representing the material or another material via the interactive interface, and further comprising:
   rendering the stack of materials to include the object representing the material and at least part of the stack of the one or more other objects below the object, wherein the material represents at least one of dirt, grass, or water.

13. The system of claim 11 wherein the user stacks an object representing a material upon a stack of one or more other objects representing the material or another material via the interactive interface, and wherein the object and the one or more other objects are represented as cubes within the computer-simulated environment.

14. The system of claim 11 wherein the mechanism coupled to the interactive interface that conveys to the user that the user interaction is with solid physical material in the virtual environment further processes the height-related information and a viewing angle associated with the user via the interactive interface within the virtual environment to render the stack of three dimensional objects at that horizontal location, including a plurality of non-occluded surfaces of the stack based at least in part on the viewing angle associated with the user within the virtual environment.

15. One or more computer storage devices having computer-executable instructions, which upon execution by a computer cause the computer to perform operations comprising:

providing a computer-simulated interactive environment, including a number of three dimensional objects configured to convey to a user that user interaction is with solid objects;

receiving the user interaction to manipulate at least one three dimensional object in the computer-simulated interactive environment;

responsive to the user interaction to manipulate the at least one three dimensional object, communicating a dataset associated with the at least one three dimensional object to graphics hardware, the dataset comprising height-related information of the at least one three dimensional object as a result of the manipulation, the height-related information comprising a height of the at least one three dimensional object relative to a base height and one or more heights or one or more immediate neighboring three dimensional objects relative to the base height, wherein the dataset associated with the at least one three dimensional object is different from a dataset associated with another three dimensional object to be manipulated; and rendering graphics in real-time based on the user interaction to manipulate the at least one three dimensional object using the dataset communicated, including the height-related information, to output an updated representation of the computer-simulated interactive environment as a result of the user interaction, wherein rendering the graphics comprises computing vertices for at least one of a front surface or a side surface of the at least one three dimensional object, including determining the vertices to render based on the height of the at least one three dimensional object and the height of an immediate neighboring three dimensional object from the dataset communicated, such that non-occluded vertices are rendered and occluded vertices are not rendered.

16. The one or more computer storage devices of claim 15 having further computer-executable instructions comprising:

receiving manipulation instructions via the user interaction that varies a height of a stack of three dimensional objects by at least one of adding the at least one three dimensional object to the stack or removing the at least one three dimensional object from the stack.

17. The one or more computer storage devices of claim 15 having further computer-executable instructions comprising:

for an individual three dimensional object at an individual horizontal location, processing height-related information and a viewing angle associated with the user within the computer-simulated interactive environment to render a stack of three dimensional objects at that horizontal location, including a plurality of non-occluded surfaces of the stack based at least in part on the viewing angle associated with the user within the computer-simulated interactive environment.

18. The one or more computer storage devices of claim 15 wherein rendering graphics based on the height-related information includes expanding the height-related information into a conceptual stack of at least one object, including drawing a top surface of an individual conceptual stack by computing vertices based upon the height-related information corresponding to that conceptual stack.

19. The one or more computer storage devices of claim 15 wherein rendering graphics based on the height-related information includes expanding the height-related information into a conceptual stack of at least one object, including drawing at least one of a front surface or a side surface of an individual conceptual stack by computing vertices based upon the height-related information corresponding to that conceptual stack.

20. The one or more computer storage devices of claim 15 having further executable instructions comprising:

computing vertices for at least one of a front or a side surface of the at least one three dimensional object to be rendered based upon the height-related information, including by changing a current base height corresponding to a level associated with a first group of three dimensional objects to provide a new base height corresponding to another level associated with another group of three dimensional objects within the computer-simulated interactive environment.

* * * * *